Jan. 8, 1924.
A. S. KROTZ
1,480,272
TRACTOR DRAWN IMPLEMENT
Filed Jan. 5, 1920
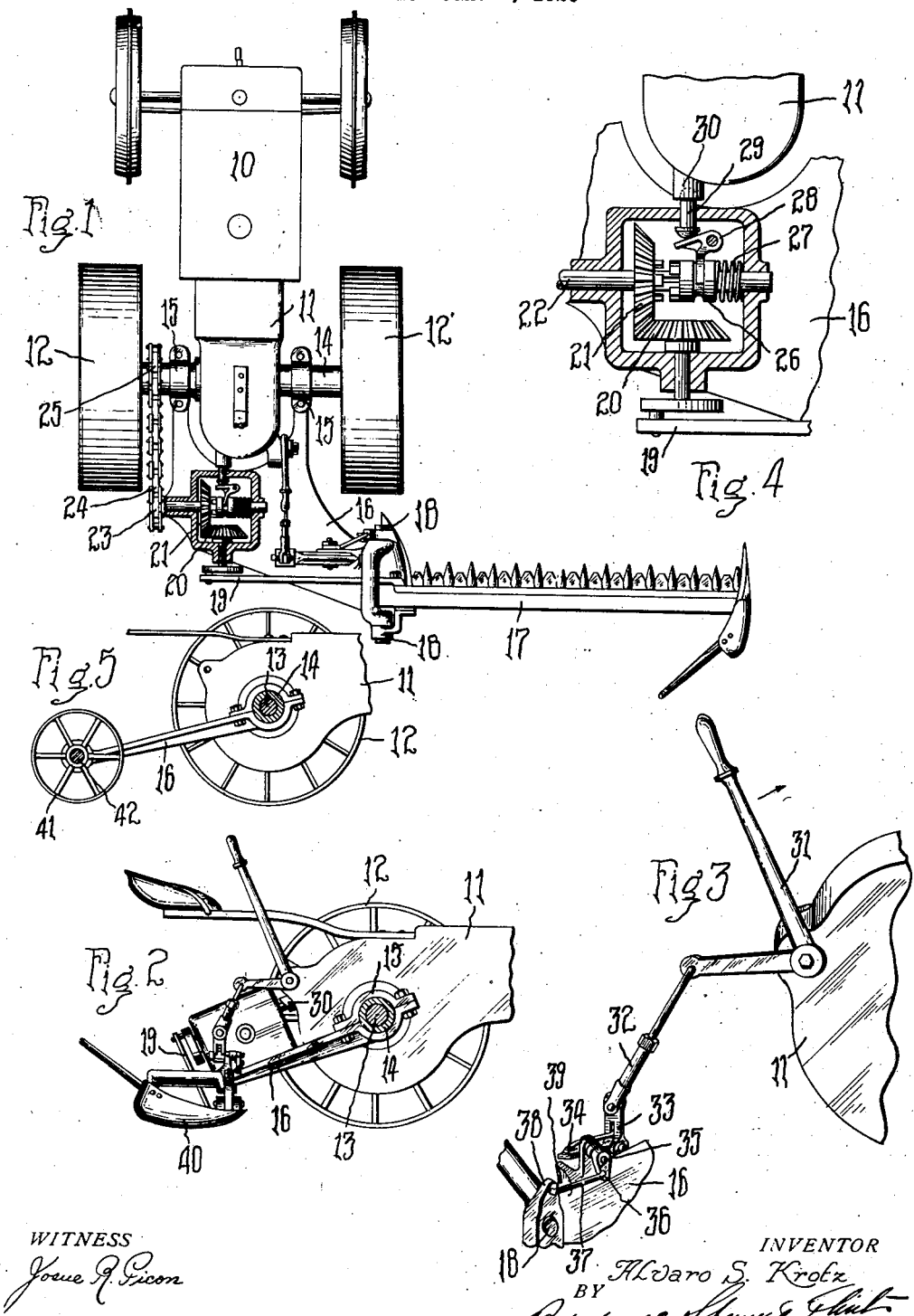
WITNESS
INVENTOR
Alvaro S. Krotz
BY
ATTORNEYS Patented Jan. 8, 1924.

1,480,272

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

TRACTOR-DRAWN IMPLEMENT.

Application filed January 5, 1920. Serial No. 349,596.

*To all whom it may concern:*

Be it known that I, ALVARO S. KROTZ, a citizen of the United States, and a resident of Janesville, county of Rock and State of Wisconsin, have invented certain new and useful Improvements in Tractor-Drawn Implements, of which the following is a full, clear, concise, and exact description, such as will enable others skilled in the art to which the invention relates to make and use the same, reference being made therein to the accompanying drawings, which form a part of this specification.

The invention relates to agricultural implements particularly of the harvester type and is especially concerned with the combination of a forward or drawing vehicle with a trailer or drawn structure, the latter being equipped with means whereby some harvesting or analogous agricultural operation may be performed.

One object of the invention is to provide an agricultural implement, including some mechanism which requires to be driven continuously or intermittently, with driving means operated from the drawing or tractor vehicle. A further object is to provide a tractor with an attachment which may be readily secured to or removed from the tractor, and which will afford the user the advantages of a complete tractor-operated agricultural implement. A further object is to provide tractor-carried means for actuating the mechanism on the trailer structure which shall tend to counteract side draft resulting from the operation of a harvesting or like implement extending to one side of the tractor.

With these and other objects in view as will hereafter more fully appear the invention comprises various combinations of mechanisms and elements all as hereinafter completely described and set forth in the claims.

In the accompanying drawings:

Fig. 1 is a plan view of a tractor and a trailer structure showing one embodiment of my invention.

Fig. 2 is an elevation, partly in section, of the structure shown in Fig. 1.

Fig. 3 is a detail view of a portion of the lifting mechanism.

Fig. 4 is a plan view of the gearing shown in Fig. 1, and

Fig. 5 is an elevation showing a modified form of ground-engaging means.

In the drawing 10 indicates a tractor which may be of any well-known or desired type, the one illustrated having the frame 11 and rear driving wheels 12, 12′, driven by axles 13 in axle housings 14.

Pivotally secured to the tractor, as by clamping means 15, is a frame 16, carrying some type of agricultural implement as the mower structure illustrated.

While I have shown a mower as one form of tractor attachment which may be utilized in accordance with my invention, I wish it to be understood that such showing is merely illustrative as regards the broad features of my invention. It will be obvious that other implements may be employed in similar manner, and particularly such implements as are designed or adapted to operate to one side of the tractor or drawing vehicle. This is especially true of such implements as mowers, grain harvesters, side-delivery hay rakes, tedders, and the like.

The mower illustrated comprises the cutter bar 17 pivotally secured as at 18 to the frame 16. The cutter is actuated in the usual manner by pitman 19 connected to gear 20 which in turn is driven by gear 21. The latter gear is mounted loosely upon shaft 22 to which is secured sprocket 23 connected by sprocket chain or belt 24 to wheel 25 rotatively fixed upon the axle of tractor wheel 12. Any appropriate or usual means, as a clutch, may be provided, if desired, to control the transmission of power to the implement from the tractor.

I have provided an automatic means for disconnecting the driving connections upon the elevation of the trailer structure. This means comprises a clutch 26, splined to shaft 22, and actuated into driving connection with gear 21 by spring 27. A clutch fork 28 is arranged to throw out the clutch when actuated by the inward movement of pin 29 slidably mounted in the gear casing. A cam 30 is provided on a portion of the frame 11 of the tractor, the parts being so related that upon elevation of frame 16 to a certain predetermined extent the cam 30 will force pin 29 inwardly and thereby disconnect the clutch.

In order to elevate the frame 16 and parts carried thereby, I employ a hand lever 31 mounted upon frame 11 and connected by links 32, 33, to lever 34, rigidly secured to one end of pin 35 pivoted in frame 16. To the other end of pin 35 is secured arm 36 connected by link 37 to arm 38 rigid with the cutter bar 17. Since the bar is pivoted at 18 the first actuation of the hand lever in the direction of the arrow, Fig. 3, will cause tilting of the cutter-bar about said pivots. A further movement of the hand lever will bring the end of lever 34 into engagement with stop 39 on frame 16, thus preventing further tilting movement of the cutter-bar. Movement of the hand lever beyond this point will result in the lifting of frame 16 and all parts carried thereby and, as above pointed out, will also cause the interruption of the driving connections.

In order to provide for the supporting of the rear end of the trailer frame from the ground surface, I may employ a shoe 40 this being the form of ground-engaging and supporting means generally employed with mowers. For some purposes, and in connection with some forms of agricultural implements it may be preferable to employ a wheeled support. I have shown such a support in Fig. 5 in which the wheel 41, suitably mounted for rotation upon the axle 42, is placed at the rear end of the frame 16.

It will be seen that the frame 16 is so connected to the tractor or forward vehicle as to have vertically swinging movement about the axle of the latter, but inasmuch as the swinging frame is connected on both sides of the tractor, no relative lateral movement is permitted. Thus the trailer frame will be guided by the tractor and maintained in proper working position relative to the path of travel of the tractor.

It will also be noted that, inasmuch as the driving wheel 25 is mounted upon the axle of the tractor co-axially with the pivotal supports of the trailer frame, the swinging movement of the trailer will not affect the driving connection through the belt or chain 24.

Furthermore, the connection of the driving means to the axle of the tractor wheel upon the side opposite to that upon which is exerted the resistance due to the operation of the implement tends to counter-act side draft in the combined structure.

It will be understood that many changes may be made in the specific embodiment and details of construction without departing from the spirit and scope of the invention, and therefore I do not wish to be limited to the structure shown.

While I have herein shown the harvesting mechanism as attached to the rear axle of the tractor and operating as a trailer it will be understood that the invention is not limited in its broader phases to such arrangement.

I claim:

1. The combination with a tractor of a harvester frame detachably secured at its forward end to the tractor to swing about the rear axle thereof and arranged to be supported rearwardly of the tractor upon the ground surface, harvesting means carried by said frame, means for driving said harvesting means from the tractor and means associated with the rear portion of the tractor and connected to said frame adapted to raise the frame from the ground surface.

2. The combination of a forward vehicle and a trailer structure removably secured to said vehicle, a harvesting mechanism carried by said trailer structure, means on said vehicle for driving said harvesting mechanism, means on said vehicle for lifting said harvesting mechanism and means operable by the lifting movement for disconnecting the said driving means from said harvesting mechanism.

3. The combination of a forward vehicle, a trailer structure pivotally secured to the axle of said forward vehicle, a harvesting means carried by said trailer structure, driving connections for said harvesting means including gearing carried by said trailer structure, means on the forward vehicle for lifting said harvesting means and means operative to disconnect said driving connections upon the operation of said lifting means.

4. The combination with a tractor of a mower frame connected to said tractor to swing about the rear axle thereof and adapted to be supported upon the ground surface rearwardly of said tractor, a driving wheel arranged to be actuated by said tractor and mounted concentrically with said rear axle, a reciprocating cutter carried by said frame, actuating means for said cutter comprising a shaft parallel with said rear axle, a belt connecting said wheel to to said shaft, and gearing connecting said shaft to said cutter.

5. The combination of a tractor, a trailer structure pivotally connected to said tractor to swing about the axle thereof and be drawn thereby, supporting means for said trailer structure adapted to travel on the ground surface to the rear of said tractor, harvesting means carried by said trailer structure, a driving wheel concentric with the axle of the tractor, and driving connections between the said wheel and the harvesting means comprising a belt actuated by said wheel and extending to driven means on said trailer structure.

6. The combination of a tractor, a frame pivotally connected by separable clamping means to the rear axle structure thereof, mowing mechanism carried by said frame, gearing carried by said frame, a driving wheel mounted concentrically with said rear axle, and a driving connection between said wheel and said gearing.

7. The combination of a tractor, a frame pivotally connected to the rear axle structure thereof, mowing mechanism carried by said frame, gearing carried by said frame, a driving wheel mounted concentrically with said rear axle and operatively connected to said gearing, means on the tractor for lifting said mowing mechanism, and means on said tractor for interrupting the driving connections upon operation of said lifting means.

8. The combination of a tractor, a trailer structure connected to said tractor to swing about the rear axle thereof, a cutter mechanism carried by said trailer structure and including a cutter-bar extending to one side of the tractor, a driving wheel connected to the axle of the tractor on the side opposite said cutter-bar, and driving connections between said wheel and said cutter mechanism.

9. The combination of a forward vehicle, a trailer structure pivotally connected to said vehicle, cutter mechanism carried by said trailer structure, gearing on the trailer structure for driving said cutter mechanism and including a clutch, means on the forward vehicle for lifting the cutter mechanism and trailer structure, and thereby giving the said gearing and clutch a bodily swinging movement, and means actuated by the said swinging movement to release the clutch as the trailer structure is lifted.

In testimony whereof I affix my signature.

ALVARO S. KROTZ.